Jan. 9, 1934.   A. M. JOHNSON ET AL   1,942,927
HYDRAULICALLY ACTUATED INDEXING MECHANISM
Filed June 15, 1931
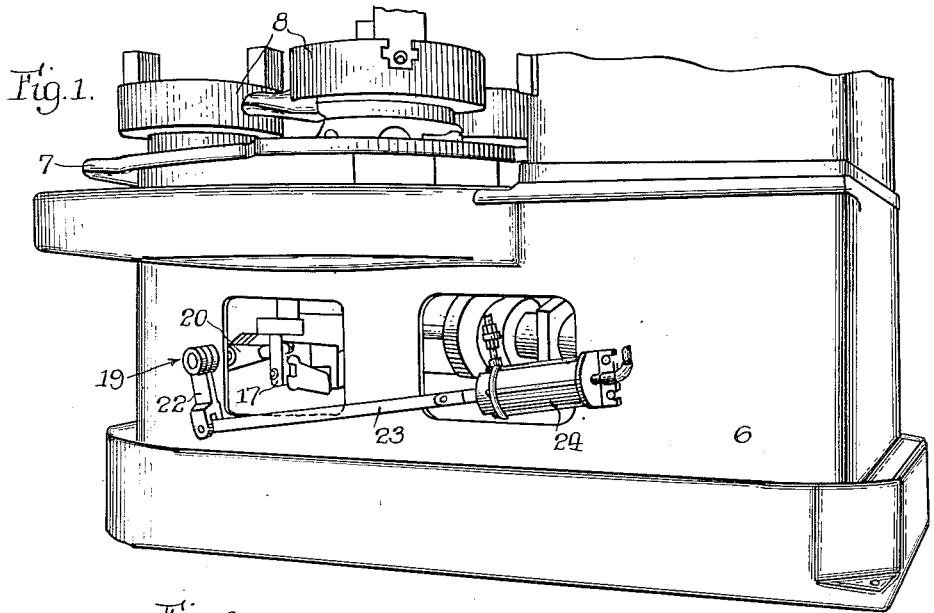
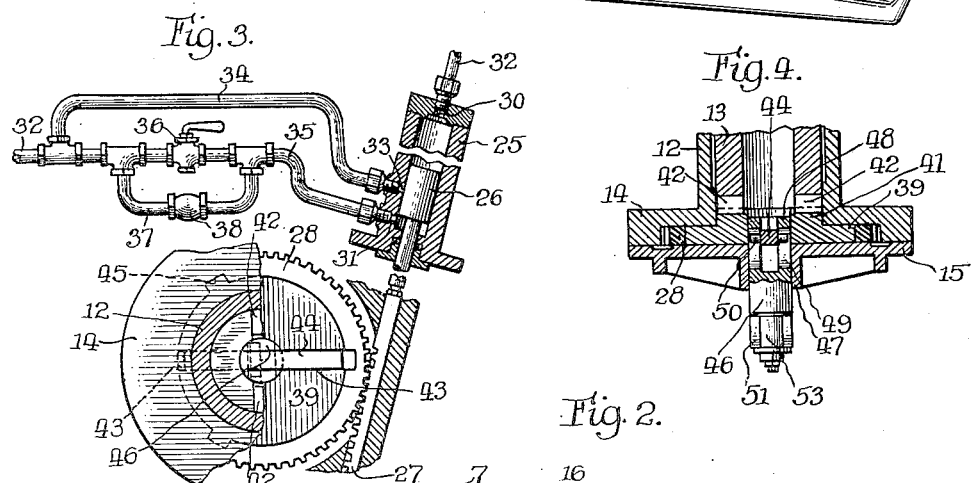
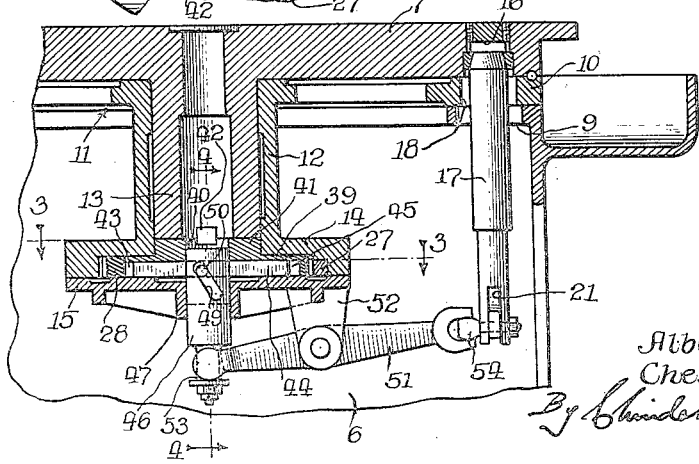
Inventors:
Albert M. Johnson,
Chester O. Holland,
By Shindel, Parker & Carlson
Attys.

Patented Jan. 9, 1934

1,942,927

UNITED STATES PATENT OFFICE 1,942,927

HYDRAULICALLY ACTUATED INDEXING MECHANISM

Albert M. Johnson and Chester O. Holland, Rockford, Ill., assignors to Barnes Drill Co., Rockford, Ill., a corporation of Illinois Application June 15, 1931. Serial No. 544,404

7 Claims. (Cl. 90—56)

This invention relates to an indexing mechanism for the work table of a machine tool, and particularly to hydraulically actuated indexing mechanisms especially adapted for use with tables of large and massive character.

The primary object of the invention is to provide an hydraulic indexing mechanism capable of imparting a rapid movement to the table and having embodied therein means of an advantageous character for cushioning the table at the end of the indexing movement.

A general object of the invention is to provide an indexing mechanism of the character indicated which is simple in construction and reliable in operation.

Other objects and advantages will become apparent as the description proceeds and from the drawing in which:

Figure 1 is a perspective view of the base and work supporting table of a machine embodying the features of this invention.

Fig. 2 is a fragmental vertical sectional view in the plane of the axis of the table.

Fig. 3 is a horizontal sectional view taken approximately in the plane of line 3—3 of Fig. 2.

Fig. 4 is a vertical sectional view taken approximately in the plane of line 4—4 of Fig. 2.

In the exemplary embodiment illustrated in the drawing, the invention is shown as adapted for use in a vertical drilling machine. Herein is shown only the lower portion of such a machine including a base 6 rotatably supporting a work table 7 adapted to carry a plurality of chucks 8 (three being shown in this instance). The table is periodically indexed to present the work successively to a plurality of tool stations.

In the present embodiment of the invention the table indexing mechanism is of the fluid operated type and consists of an hydraulic actuator especially constructed to produce a retarding or cushioning effect on the table at the end of each indexing operation, and a disengageable driving connection between the actuator and the table adapted to render the former effective as a retarding means.

The portion of the base 6 forming the support for the table 7 is hollow and substantially circular, with an annular inwardly projecting flange 9 at its upper edge. This flange supports the outer rim 10 of a spider 11 having a center post 12 which forms a bearing for a hollow spindle 13 of the table 7. Bearing surfaces are formed on the rim 10 and the center post 12 upon which the table 7 rests. At its lower end, the center post 12 has an enlarged portion 14 coacting with a centrally apertured plate 15 to form a housing for a portion of the table-driving means to be later described.

Formed in the table near the outer edge thereof and equally spaced circumferentially are a series of holes or sockets 16, corresponding in number to the number of tool stations. Said sockets open downwardly to receive the upper end of a locking plunger 17 reciprocably mounted at one edge of the base 6 and projecting through an aperture 18 in the rim 10.

The means herein shown for retracting the plunger 17 comprises a bell crank lever 19 journaled in the base 6 having one arm 20 projecting into a slot 21 in the plunger 17 and another arm 22 connected by a link 23 to the piston of an air cylinder 24, the latter being adapted to be supplied by compressed air under the control of the operator of the machine.

The hydraulic actuator of the indexing mechanism comprises a cylinder 25 rigid in the base 6 and a piston 26 reciprocating therein which is connected to a rack 27 projecting into the housing portion of the center post 12 tangentially of the bore therein and meshing with a floating ring-gear 28 forming a part of the driving mechanism which has a disengageable clutch connection with the table. The cylinder has a port 30 in the head or outer end as well as a port 31 in the side wall adjacent the opposite or inner end, which ports are connected by means including pipes 32 to the source of fluid supply. A suitable valve (not shown) for controlling the admission and exhaust of fluid to and from the cylinder is coordinated in a well-known manner with the control of the plunger 17 so as to connect alternately the port 30 and the port 31 to the fluid under pressure to effect a power and a return stroke of the piston respectively, one of the ports being connected in each operation to an exhaust reservoir to permit discharge of the fluid remaining in the cylinder from the previous stroke.

Advantage is taken of the non-compressibility of the actuating fluid in adapting the cylinder and piston to serve both as a means for rotating the table and as a means for gradually arresting the table, thereby eliminating special mechanism usually provided for that purpose. In accordance therewith a second port 33 is formed in the side wall of the cylinder spaced outwardly a short distance from the port 31 and adapted to be opened and closed by the piston 26 in its reciprocatory movement. The inner end of the cylinder 25 is thus provided with two ports serving as exhaust ports during the power stroke of the piston, the upper port 33 being connected to the pipe 32 by a branch pipe 34 having no flow restricting or retarding means. The port 31, however, is connected to the pipe 32 by a branch pipe 35 having a valve 36 which may be adjusted to regulate the flow of fluid therethrough.

During the initial portion of the power stroke of the piston 26 the fluid in the cylinder flows unrestricted through the port 33, and the pipe 34 offering no appreciable resistance to the movement of the piston. Near the end of the stroke, however, when the table 7 has been rotated slightly less than required for one indexing movement, the port 33 is closed by the piston 26 and the fluid forced through the restricted pipe 36, thus resisting the movement of the piston. The movement of the piston 26 is dependent upon the rate of flow of the fluid through the pipe which in turn is dependent upon the pressure applied to the fluid of which the momentum of the table is a factor. This momentum is gradually spent, forcing the fluid through the restricted pipe.

It is apparent, therefore, that the inner end of the cylinder acts as a dash-pot, gradually but rapidly decelerating the table to bring it to a stop at the proper position without shock.

To permit unrestricted flow into the cylinder through the port 31 for effecting a return stroke of the piston, a by-pass pipe 37 is connected around the restricting valve 36, which pipe 37 contains a check valve 38. This valve permits a flow into the cylinder 25 but prevents all flow through the pipe 37 in a counter direction.

In order that the piston 26 and cylinder 25 may act as a decelerating means for the table 7 but impart rotation to the table in only one direction, the disengageable driving connection with the table must be of special construction. To this end there is mounted in the housing formed by the enlarged portion of the center post 12 a disk 39 whose diameter is slightly less than the inner circumference of the ring-gear 28 and is placed within the ring-gear. The disk 39 has a central bore 40 and a hub 41 journaled in the center 12, and is rigidly secured to the spindle 13 by a pair of keys 42. In the lower face of the disk 39 is a diametrical slot 43 which receives slidably within it a square bolt 44 substantially equal in length to the diameter of the disk. To couple the ring-gear 28 with the table 7 one end of the bolt 44 is projected into one of a plurality of notches 45 formed in the inner circumference of the ring-gear, thereby forming a two-way connection positively coupling the table and piston against relative movement in either direction of rotation of the table. The notches 45 correspond in number to the number of tool stations, being three in this instance.

The bolt 44 is inserted or retracted from engagement with the notches 45 by a forked plunger 46 projecting upwardly into the housing, astraddle of the bolt 44, through the aperture in the plate 15 which is formed with an annular flange 47 to guide the plunger. Each prong 48 of the plunger 46 has a slot 49 oblique to the axis of the plunger which receives one end of a pin 50 extending transversely through the bolt 44. Reciprocation of the plunger 46 thereby imparts longitudinal movement to the bolt 44 to engage or disengage the ring-gear 28 and the table 7. The slots 49 are so positioned that upward movement of the plunger 46 moves the bolt 44 into engagement with the ring-gear 28 while a downward movement retracts the bolt.

Movement is imparted to the plunger 46 by a lever 51 pivoted intermediate its ends on a lug 52 projecting from the plate 15. Both ends of the lever 51 are forked, the one engaging a reduced portion 53 of the plunger to permit rotation thereof but held against relative movement axially of the plunger. The other end of the lever 51 engages the ball-shaped end of a bolt 54 on the table-locking plunger 17 by which motion is imparted to the lever. The lever 51 thus coordinates the movement of the plunger 17 and the bolt 44 to free the ring-gear 28 when the table is locked and vice versa.

The operation of the indexing mechanism may be summarized briefly as follows: When the operator of the machine desires to index the table 7, he admits air to the cylinder 24. As a result, the crank-lever 19 is rocked to withdraw the plunger 17, thereby releasing the table 7. Simultaneously with the retraction of the plunger 17, the connecting lever 51 actuates the bolt 44 to couple the table positively to the ring-gear 28 and hence to the piston 26 which now occupies the head end of the cylinder 25. The port 30 is then opened to the pressure side of the fluid source, while the ports 31 and 33 are opened to exhaust. The piston 26 will then move forward, rotating the table 7 in a clockwise direction as viewed in Fig. 3. The oil remaining in the cylinder from the previous return stroke of the piston flows out through the port 33, with but little resistance to the piston, until the piston approaches the end of its stroke when it closes the port 33 and must then force the oil through the restricted passage leading from the port 31. Thus the table 7 is gradually brought to a stop with the work properly positioned beneath the tools. The table is again locked in position by operation of the bell crank 19 to project the plunger 17 into a socket 16. At the same time the bolt 44 is retracted and the ring-gear 28 freed. Admission of fluid through the ports 31 and 33 will return the piston 26 to the head end of the cylinder and position a notch of the ring-gear 28 opposite the end of the bolt 44 to receive the bolt for the next indexing of the table.

We claim as our invention:

1. An indexing mechanism for machine tools having in combination with a rotatable table, an annular member concentric with the table, fluid-actuated reciprocatory power means connected to said member and including a dash-pot to retard the power stroke of said means, a reciprocable bolt positioned diametrically within said member and held against rotation relative to the table, a pin extending transversely of said bolt, and a plunger reciprocable transversely of said bolt, said plunger having a slot oblique to the axis thereof receiving the projecting end of said pin to project said bolt into positive engagement with said member.

2. In an indexing mechanism for a machine tool having a rotatable table and hydraulic means for indexing the table, the combination of a spindle rigid with the table, a floating ring-gear concentric with the spindle and adapted to be actuated by said hydraulic means, said ring-gear having notches on its inner circumference, a bolt positioned diametrically within said ring-gear and slidable transversely of the spindle, a pin extending transversely of said bolt, and a forked plunger reciprocable transversely of said bolt and said pin, said plunger having slots in its forked portions extending obliquely to the axis of the plunger and receiving the projecting ends of said pin to move said bolt into or out of engagement with the notches in said ring-gear.

3. In a machine, the combination of a rotatable table to be successively indexed, means for locking the table in position, reciprocatory power means, a rotary member oscillated by said power means, means for coupling said member and said table including a bolt adapted positively to engage said member, a plunger having a pin and slot connection with said bolt to project said bolt into or out of engagement with said member in the reciprocation of said plunger, and a lever engaging said plunger and actuated by said locking means to reciprocate said plunger to couple or uncouple said table and power means respectively as the table is free or locked against rotation.

4. In a machine tool, the combination of a table mounted for rotation on a vertical axis and having a depending spindle, a housing in part forming a bearing for the spindle, a floating ring-gear of smaller diameter than the table positioned within said housing concentrically of the spindle, a reciprocatory fluid-operated device positioned beneath the table and connected to said ring-gear, said device including a dash-pot for retarding the power stroke thereof, clutch mechanism within said housing adapted to couple said ring-gear and the table and including a plunger reciprocable axially of the table and projecting through said housing, a second plunger reciprocable in a stationary portion of the machine and operable to engage the periphery of the table to lock the same against rotation, and mechanical means interconnecting said plungers.

5. In a machine tool having a table to be indexed, an indexing mechanism comprising, in combination, a floating ring-gear of smaller diameter than the table and concentric with the axis thereof, a reciprocatory fluid-operated device connected to said ring-gear to oscillate the same, said device including a dash-pot for retarding the power stroke thereof, a bolt positioned diametrically of said ring-gear and adapted to connect or disconnect said ring-gear and the table, a plunger reciprocable axially of the table and having an engagement with said bolt whereby reciprocation of the plunger actuates said bolt to connect or disconnect said ring-gear and the table, a second plunger reciprocable parallel with the first named plunger in a stationary portion of the machine and engageable with the periphery of the table to lock the same against rotation, and a single lever interconnecting said plungers, the engagement of said bolt and plunger being such as to connect or disconnect said ring-gear and table respectively as the second plunger is reciprocated to unlock or lock the table.

6. An indexing mechanism for machine tools having in combination with a rotatable table, an annular member concentric with the table, fluid-actuated reciprocatory power means connected to said member and including a dash pot to retard the power stroke thereof, a reciprocable bolt positioned diametrically within said member and held against rotation relative to the table, a plunger reciprocable transversely of said bolt, cooperating cam means on said bolt and said plunger operable in the reciprocation of said plunger to project said bolt into and retract it from positive engagement with said member, and means for actuating said plunger.

7. In a machine tool, the combination of a table mounted for rotation on a vertical axis and having a depending spindle, a floating ring-gear of smaller diameter than the table mounted concentrically of the spindle, a reciprocatory fluid-operated device positioned beneath the table and connected to said ring-gear, said device including means for cushioning the power stroke thereof, a clutch adapted to couple said ring-gear and the table against relative movement in either direction, a plunger reciprocable in a stationary portion of the machine and operable to engage the table to lock the same against rotation, and means for actuating said clutch including a second plunger mounted for endwise movement axially of the table, and lever means connecting said plungers.

ALBERT M. JOHNSON.
CHESTER O. HOLLAND.